(12) United States Patent
Sun

(10) Patent No.: US 10,288,923 B2
(45) Date of Patent: May 14, 2019

(54) COA ARRAY SUBSTRATE AND LIQUID CRYSTAL DISPLAY PANEL

(71) Applicant: Wuhan China Star Optoelectronics Technology Co., Ltd., Wuhan, Hubei (CN)

(72) Inventor: Tao Sun, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 77 days.

(21) Appl. No.: 15/520,412

(22) PCT Filed: Mar. 21, 2017

(86) PCT No.: PCT/CN2017/077466
§ 371 (c)(1),
(2) Date: Apr. 19, 2017

(87) PCT Pub. No.: WO2018/157423
PCT Pub. Date: Sep. 7, 2018

(65) Prior Publication Data
US 2018/0299723 A1    Oct. 18, 2018

(51) Int. Cl.
*G02F 1/1333* (2006.01)
*G02F 1/1368* (2006.01)
*G02F 1/1335* (2006.01)
*G02F 1/1362* (2006.01)

(52) U.S. Cl.
CPC ...... *G02F 1/133345* (2013.01); *G02F 1/1368* (2013.01); *G02F 1/133514* (2013.01); *G02F 1/136227* (2013.01); *G02F 2001/136222* (2013.01); *G02F 2201/503* (2013.01)

(58) Field of Classification Search
USPC .................................................. 349/106–108
See application file for complete search history.

(56) References Cited

U.S. PATENT DOCUMENTS

2017/0192280 A1*   7/2017   Kwak ............... G02F 1/133345

FOREIGN PATENT DOCUMENTS

| CN | 102053296 A | 5/2011 |
| CN | 202563214 U | 11/2012 |
| CN | 104375344 A | 2/2015 |
| CN | 104965366 A | 10/2015 |
| CN | 105353571 A | 2/2016 |

(Continued)

*Primary Examiner* — Phu Vu
(74) *Attorney, Agent, or Firm* — Andrew C. Cheng

(57) ABSTRACT

This disclosure discloses a COA array substrate, including a base substrate, and an array of pixel structures disposed on the base substrate, wherein the pixel structure is provided with a color filter layer, the color filter layer includes a first portion and a second portion, the first portion of the color filter layer covers a display region of the pixel structure correspondingly, the second portion of the color filter layer covers a non-display region of the pixel structure correspondingly; in the second portion of the color filter layer is provided with vent holes. This disclosure also discloses a liquid crystal display panel, including an array substrate and a cell aligning substrate disposed oppositely, the liquid crystal molecules are disposed between the array substrate and the cell aligning substrate, wherein the array substrate described above uses the COA array substrate.

18 Claims, 2 Drawing Sheets

(56) References Cited

FOREIGN PATENT DOCUMENTS

| | | | |
|---|---|---|---|
| CN | 105700258 | A | 6/2016 |
| CN | 106324933 | A | 1/2017 |
| KR | 20070063056 | A | 6/2007 |
| KR | 20140098402 | A | 8/2014 |

* cited by examiner

COA ARRAY SUBSTRATE AND LIQUID CRYSTAL DISPLAY PANEL

TECHNICAL FIELD

This disclosure relates to the field of display technology, in particular to a COA array substrate and a liquid crystal display panel containing a COA array substrate.

DESCRIPTION OF RELATED ART

Since the liquid crystal display device (LCD) has many advantages such as thin fuselage, low power, no radiation, it has been widely used, e.g. LCD TV, mobile phone, personal digital assistant (PDA), digital camera, computer screen or laptop screens.

A LCD device typically includes a case, a liquid crystal display panel and a backlight module provided in the case. Wherein the structure of the liquid crystal display panel is mainly composed of a thin film transistor array (TFT Array) substrate, a color filter (CF) substrate, and a liquid crystal layer disposed between the two substrates, the operation principle is that application of driving voltage to the two glass substrates is carried out to control the rotation of the liquid crystal molecules of the liquid crystal layer in order to refract out light emitting from the backlight module for generating images.

COA (Color-filter on Array) technology is an integrated technology to form the color filter layer on the array substrate directly, and the color filter substrate is only provided with a black matrix (Black Matrix, BM) and a photo spacer (PS) layer. COA technology can effectively solve problems like the light leakage caused by the deviation of alignment during the cell-aligning process of the liquid crystal display device, and can significantly improve the aperture ratio.

In COA technology, forming the color filter layer directly on the array substrate increases the difficulty of the process, especially the problem that the residual gas in the color filter layer penetrates into the liquid crystal layer to form bubbles. Specifically, the main material of the color filter layer is organic material, during the fabrication of the color filter layer by the prior art, gas inevitably remains in the interior of the color filter layer, meanwhile, due to the characteristics of organic matter, under certain conditions such as a long period of high temperatures, or high-pressure environment, or by external shock or the display is under vibration, carbon oxides gas of small molecules, such as CO, $CO_2$ are released from the interior of the color filter layer, after these small-molecule gases are generated, they will penetrate the thinner film layer of the color filter layer surface (such as a passivation layer, an alignment layer . . . ) into the liquid crystal layer in the local formation of bubbles, this will affect the display effects and reduce product yield. Therefore, for the COA technology, how to avoid the gas in the color filter layer to penetrate into the liquid crystal layer to form bubbles is a serious problem to be solved in the industry.

SUMMARY

In view of such deficiencies in the prior art, this disclosure provides a COA array substrate, can effectively reduce the gas remaining in the color filter layer to penetrate into the liquid crystal layer to form bubble defects. To achieve the above goal, this disclosure uses the following technical solution:

A COA array substrate, comprising a base substrate, and an array of pixel structures disposed on the base substrate, wherein the pixel structure is provided with a color filter layer, the color filter layer comprises a first portion and a second portion, the first portion of the color filter layer covers a display region of the pixel structure correspondingly, the second portion of the color filter layer covers a non-display region of the pixel structure correspondingly; the second portion of the color filter layer is provided with vent holes.

Wherein the vent holes pass through the second portion of the color filter layer along thickness direction of the second portion of the color filter layer.

The number of the vent holes is multiple, and the vent holes are distributed in equally spaced apart to each other.

The shape of the vent holes is circular or square.

The vent holes have a circular shape, and a diameter of cross-section of the circular shape is 3~6 µm.

The vent holes have a square shape, and a length of cross-sectional side of the square shape is 3~6 µm.

The pixel structure further comprises a thin film transistor and a pixel electrode disposed on the base substrate, the thin film transistor is covered with a first passivation layer, the color filter layer is covered with a second passivation layer, and the pixel electrode is disposed on the second passivation layer; wherein the pixel electrode is electrically connected to the thin film transistor through a via hole disposed in the first passivation layer, the color filter layer, and the second passivation layer.

The pixel structure comprises a red sub-pixel, a green sub-pixel, and a blue sub-pixel, the red sub-pixel color filter layer is a red filter layer, the green sub-pixel color filter layer is a green filter layer, and the blue sub-pixel color filter layer is a blue filter layer.

The material of the first passivation layer and the second passivation layer is silicon nitride, silicon oxide or compositions of silicon nitride and silicon oxide; the pixel electrode material is selected from one or more of indium tin oxide, indium zinc oxide, aluminum tin oxide, aluminum zinc oxide and indium germanium zinc oxide.

Another aspect of this disclosure is to provide a liquid crystal display panel including an array substrate and a cell aligning substrate disposed oppositely, the liquid crystal molecules are disposed between the array substrate and the cell aligning substrate, wherein the array substrate described above uses the COA array substrate.

Compared to the prior art, the COA array substrate provided by embodiment of this disclosure includes vent holes disposed through the portion of the color filter layer covering the non-display region correspondingly, first, during the process of preparing the color filter layer, the gas inside the color filter layer can be smoothly discharged through these vent holes, the amount of residual gas inside the color filter layer can be reduced; secondly after a liquid crystal display panel is formed into a complete package, if the liquid crystal display panel at a high temperature impact, high-voltage shock or external shock results in the case with a minute fluid passage between the liquid crystal layer and the color filter layer, at this time due to the presence of the vent holes with a relatively large pore size (with respect to the aforementioned minute fluid passage), the gas phase equilibrium is transferred from the interface of the liquid crystal layer to the vent holes, the small molecular gas released from interior of the color filter layer is difficult to penetrate into the liquid crystal layer, so that the formation of bubble defects can be avoided.

BRIEF DESCRIPTION

DETAILED DESCRIPTION OF EMBODIMENTS

In order to make the objectives, technical solutions and advantages become more apparent, more detailed description of the present disclosure is made below with reference to the drawings and embodiments. It is to be understood that the specific embodiments explained herein are intended for the purpose of description only and shall not be used to limit the present disclosure.

Here, it should be noted that, in order to avoid unnecessary detail obscure this disclosure, the drawings only show a structure and/or processing steps closely related to the solutions according to this disclosure, and omit other details little relevant to this disclosure.

Figure 1:
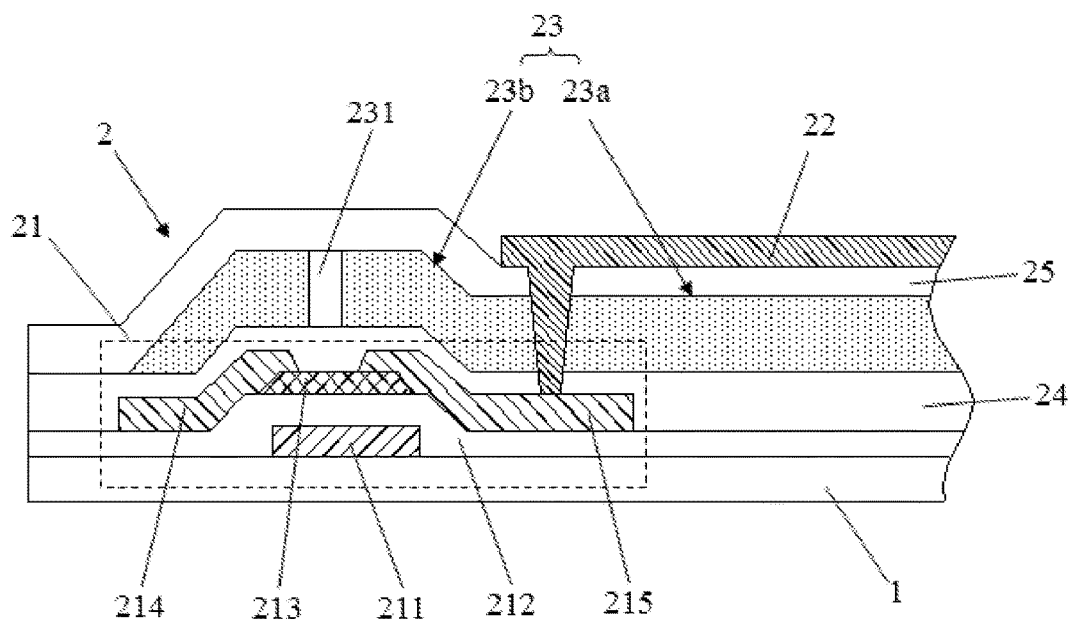
FIG. 1 is a schematic diagram for showing a structure of the COA array substrate according to the embodiment of this disclosure.
Figure 2:
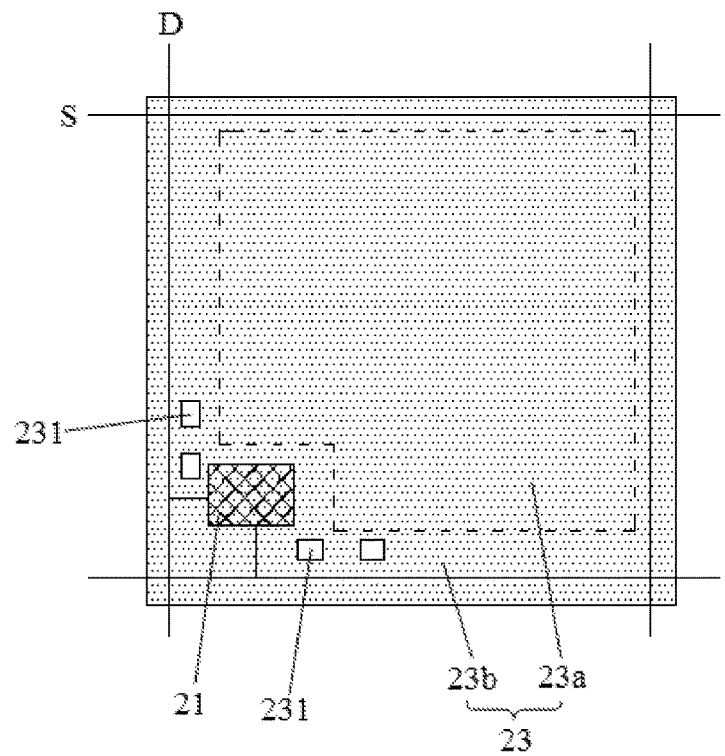
FIG. 2 is a schematic diagram for showing the pixel structure of the embodiment of this disclosure.

First, this embodiment provides a COA array substrate, see FIG. 1 and FIG. 2, the COA array substrate includes a base substrate 1, and an array of pixel structures 2 disposed on the base substrate 1 (the drawings only shows one of the pixel structures exemplarily).

The pixel structure 2 includes a scan line S, a data line D, a thin film transistor 21, and a pixel electrode 22. The scan lines S and the data lines D intersect to each other to define a pixel region, the thin film transistors 21 and the pixel electrodes 22 are disposed in the pixel region, the thin film transistor 21 connects the pixel electrode 22 to the linear the scan line S and the data line D.

The pixel structure 2 is provided with a color filter layer 23, thereby forming the COA array substrate. Specifically, as shown in FIG. 1, the thin film transistor 21 is disposed on the base substrate 1, the thin film transistor 21 is covered with a first passivation layer 24, the color filter layer 23 is covered with a second passivation layer 25, and the pixel electrode 22 is disposed on the second passivation layer 25; wherein the pixel electrode 22 is electrically connected to the thin film transistor 21 through a via hole disposed in the first passivation layer 24, the color filter layer 23, and the second passivation layer 25.

The pixel structure 2 includes a red sub-pixel, a green sub-pixel, and a blue sub-pixel, the red sub-pixel color filter layer 23 is a red filter layer, the green sub-pixel color filter layer 23 is a green filter layer, and the blue sub-pixel color filter layer 23 is a blue filter layer.

The material of the first passivation layer 24 and the second passivation layer 25 is silicon nitride, silicon oxide or compositions of silicon nitride and silicon oxide; the material of the pixel electrode 22 is selected from one or more of indium tin oxide, indium zinc oxide, aluminum tin oxide, aluminum zinc oxide and indium germanium zinc oxide.

Referring to FIG. 1, the thin film transistor 21 includes a gate electrode 211, a gate insulating layer 212, an active layer 213, a source electrode 214, and a drain electrode 215. Specifically, the gate electrode 211 is formed on the base substrate 1, a gate insulating layer 212 is provided overlying the gate electrode 211, the active layer 213 is formed on the gate insulating layer 212 and is oppositely located above the gate electrode 211, the source electrode 214 and the drain electrode 215 are formed on the gate insulating layer 212. The source electrode 214 and the drain electrode 215 are spaced from each other and have portions overlapping on the active layer 213 respectively, the pixel electrode 22 is electrically connected to the drain electrode 215.

In this embodiment, the color filter layer 23 is provided with vent holes 231. Specifically, referring to FIG. 1 and FIG. 2, the color filter layer 23 includes a first portion and a second portion, the first portion 23a of the color filter layer covers a display region of the pixel structure 2 correspondingly, the second portion 23b of the color filter layer covers a non-display region of the pixel structure 2 correspondingly. Wherein, the vent holes 231 are disposed in the second portion 23b of the color filter layer, i.e. corresponding to the non-display region of the pixel structure 2. Noted that in FIG. 2, the scan line S, the data line D, and the thin film transistor 21 are located relatively below the color filter layer 23, in order to better illustrate the color filter layer 23, the pixel electrode 22 located on the color filter layer 23 is not shown in FIG. 2.

The COA array substrate provided by the above embodiment includes the vent holes disposed through the portion of the color filter layer covering the non-display region correspondingly. First, during the process of preparing the color filter layer, the gas inside the color filter layer can be smoothly discharged through these holes, the amount of residual gas inside the color filter layer can be reduced; secondly after a liquid crystal display panel is formed into a complete package, if the liquid crystal display panel at a high temperature impact, high-voltage shock or external shock results in the case with a minute fluid passage between the liquid crystal layer and the color filter layer, at this time due to the presence of the vent holes with a relatively large pore size (with respect to the aforementioned minute fluid passage), the gas phase equilibrium is transferred from the interface of the liquid crystal layer to the vent holes, the small molecular gas released from interior of the color filter layer is difficult to penetrate into the liquid crystal layer, so that the formation of bubble defects can be avoided. Further, the vent hole is disposed in the non-display region of the pixel structure, the contour of the vent hole does not affect the normal display of the pixel.

In this embodiment, see FIG. 1 and FIG. 2, the vent hole 231 passes through the second portion of the color filter layer along thickness direction of the second portion 23b of the color filter layer. Wherein the number of the vent holes 231 are multiple, and in some of other embodiments, the vent holes are distributed in equally spaced apart to each other, several vent holes are shown exemplarily in the FIG. 2.

Figure 3:
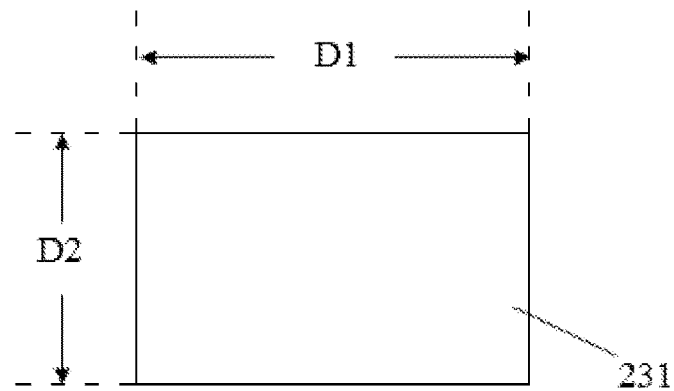
FIG. 3 is a schematic diagram for showing a structure of vent holes according to the embodiment of the disclosure.
Figure 4:
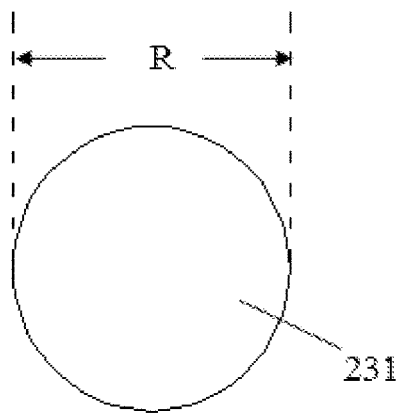
FIG. 4 is a schematic diagram for showing a structure of vent holes according to another embodiment of the disclosure.

The size, morphology, and density of the vent hole 231 are not particularly limited. But the verification proves that when the design of the vent hole 231 is square or circular, the vent hole exhausts better. See FIGS. 2 and 3, in this embodiment, the shape of the vent holes 231 is square, and when the sides D1, D2 of the cross section of the vent hole is within the range of 3~6 μm, the optimum exhausting effect can be obtained. Further, in other embodiments, when the shape of the vent hole 231 is circular, the optimum range of the diameter R of the cross section is 3~6 μm.

Figure 5:
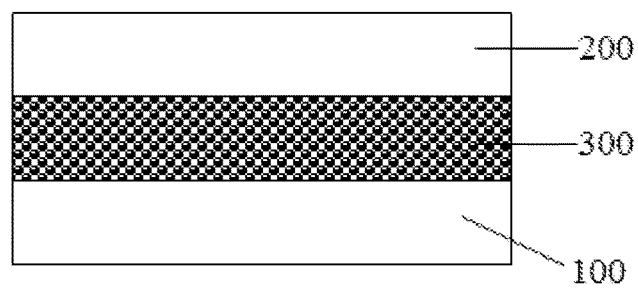
FIG. 5 is a schematic diagram for showing a structure of a liquid crystal panel according to the embodiment of this disclosure.

Further, this embodiment also provides a liquid crystal display panel, as shown in FIG. 5, the liquid crystal display panel includes an array substrate 100 and a cell aligning substrate 200 disposed oppositely, liquid crystal molecules 300 are disposed between the array substrate 100 and the cell aligning substrate 200. The array substrate uses the COA array substrate provided by the above embodiment. It should be noted that the cell aligning substrate 200 is provided with a black matrix (BM), and the black matrix corresponds to the non-display region of the pixel structure.

It should be noted that, in this document, relational terms such as first and second, and the like may be used solely to distinguish one entity or action from another entity or action without necessarily requiring or implying any actual such relationship or order between such entities or actions. Further, the terms "include", "comprise" or any other variants thereof are intended to encompass non-exclusive inclusion such that a process, method, article or device including a series of elements includes not only those elements, but also other elements that have not been listed explicitly, or further includes elements inherent in the process, method, article or device. Without any further limitations, an element defined by expression "including a . . . " does not exclude additional identical elements in the process, method, article or device including said element.

Disclosed above is only one preferred embodiment of this disclosure. It should be pointed out that, for those ordinary skilled in the art, various improvements and modifications can be made without departing the principle of the present application, and these improvements and modifications are also considered as the protection scope of the present application.

What is claimed is:

1. A COA array substrate, comprising a base substrate, and an array of pixel structures disposed on the base substrate, wherein the pixel structure is provided with a color filter layer, the color filter layer comprises a first portion and a second portion, the first portion of the color filter layer covers a display region of the pixel structure correspondingly, the second portion of the color filter layer covers a non-display region of the pixel structure correspondingly; the second portion of the color filter layer is provided with vent holes.

2. The COA array substrate according to claim 1, wherein the vent holes pass through the second portion of the color filter layer along thickness direction of the second portion of the color filter layer.

3. The COA array substrate according to claim 2, wherein number of the vent holes is multiple, and the vent holes are distributed in equally spaced apart to each other.

4. The COA array substrate according to claim 2, wherein shape of the vent hole is circular or square.

5. The COA array substrate according to claim 4, wherein the vent holes have a circular shape, and a diameter of cross-section of the circular shape is 3~6 µm.

6. The COA array substrate according to claim 4, wherein the vent holes have a square shape, and a length of cross-sectional side of the square shape is 3~6 µm.

7. The COA array substrate according to claim 1, wherein the pixel structure further comprises a thin film transistor and a pixel electrode disposed on the base substrate, the thin film transistor is covered with a first passivation layer, the color filter layer is covered with a second passivation layer, and a pixel electrode is disposed on the second passivation layer; wherein the pixel electrode is electrically connected to the thin film transistor through a via hole disposed in the first passivation layer, the color filter layer and the second passivation layer.

8. The COA array substrate according to claim 7, wherein the pixel structure comprises a red sub-pixel, a green sub-pixel, and a blue sub-pixel, the red sub-pixel color filter layer is a red filter layer, the green sub-pixel color filter layer is a green filter layer, and the blue sub-pixel color filter layer is a blue filter layer.

9. The COA array substrate according to claim 7, wherein material of the first passivation layer and the second passivation layer is silicon nitride, silicon oxide or compositions of silicon nitride and silicon oxide; material of the pixel electrode is selected from one or more of indium tin oxide, indium zinc oxide, aluminum tin oxide, aluminum zinc oxide and indium germanium zinc oxide.

10. A liquid crystal display panel, comprising an array substrate and a cell aligning substrate disposed oppositely, liquid crystal molecules are disposed between the array substrate and the cell aligning substrate, wherein the array substrate is a COA array substrate, the COA array substrate comprises a base substrate, and an array of pixel structures disposed on the base substrate, wherein the pixel structure is provided with a color filter layer, the color filter layer comprises a first portion and a second portion, the first portion of the color filter layer covers a display region of the pixel structure correspondingly, the second portion of the color filter layer covers a non-display region of the pixel structure correspondingly; the second portion of the color filter layer is provided with vent holes.

11. The liquid crystal display panel according to claim 10, wherein the vent holes pass through the second portion of the color filter layer along thickness direction of the second portion of the color filter layer.

12. The liquid crystal display panel according to claim 11, wherein number of the vent holes is multiple, and the vent holes are distributed in equally spaced apart to each other.

13. The liquid crystal display panel according to claim 11, wherein shape of the vent hole is circular or square.

14. The liquid crystal display panel according to claim 13, wherein the vent holes have a circular shape, and a diameter of cross-section of the circular shape is 3~6 µm.

15. The liquid crystal display panel according to claim 13, wherein the vent holes have a square shape, and a length of cross-sectional side of the square shape is 3~6 µm.

16. The liquid crystal display panel according to claim 10, wherein the pixel structure further comprises a thin film transistor and a pixel electrode disposed on the base substrate, the thin film transistor is covered with a first passivation layer, the color filter layer is covered with a second passivation layer, and a pixel electrode is disposed on the second passivation layer; wherein the pixel electrode is electrically connected to the thin film transistor through a via hole disposed in the first passivation layer, the color filter layer, and the second passivation layer.

17. The liquid crystal display panel according to claim 16, wherein the pixel structure comprises a red sub-pixel, a green sub-pixel, and a blue sub-pixel, the red sub-pixel color filter layer is a red filter layer, the green sub-pixel color filter layer is a green filter layer, and the blue sub-pixel color filter layer is a blue filter layer.

18. The liquid crystal display panel according to claim 16, wherein material of the first passivation layer and the second passivation layer is silicon nitride, silicon oxide or compositions of silicon nitride and silicon oxide; the pixel electrode material is selected from one or more of indium tin oxide, indium zinc oxide, aluminum tin oxide, aluminum zinc oxide and indium germanium zinc oxide.

* * * * *